United States Patent
Heinze et al.

(10) Patent No.: US 8,400,947 B2
(45) Date of Patent: Mar. 19, 2013

(54) METHODS, SYSTEMS, AND COMPUTER PROGRAM PRODUCTS FOR SPECIFYING A PARTICULAR ENUM SERVICE TYPE IN A COMMUNICATIONS NETWORK THAT UTILIZES A PLURALITY OF DIFFERENT ENUM SERVICE TYPES

(75) Inventors: Christopher R. Heinze, Raleigh, NC (US); Peter J. Marsico, Chapel Hill, NC (US); Maria A. Wiatrowski, Raleigh, NC (US)

(73) Assignee: Tekelec, Inc., Morrisville, NC (US)

( * ) Notice: Subject to any disclaimer, the term of this patent is extended or adjusted under 35 U.S.C. 154(b) by 1337 days.

(21) Appl. No.: 11/880,108

(22) Filed: Jul. 19, 2007

(65) Prior Publication Data

US 2008/0025492 A1 Jan. 31, 2008

Related U.S. Application Data

(60) Provisional application No. 60/832,215, filed on Jul. 20, 2006.

(51) Int. Cl.
*H04L 12/16* (2006.01)

(52) U.S. Cl. ............ 370/259; 370/522; 379/201.01

(58) Field of Classification Search ............ 370/255, 370/259, 352, 389, 395.3, 401, 422; 379/88.17, 379/67.1, 88.13, 88.18, 201.01, 218.01, 265.09, 379/900

See application file for complete search history.

(56) References Cited

U.S. PATENT DOCUMENTS

| | | | |
|---|---|---|---|
| 6,539,077 B1 | 3/2003 | Ranalli et al. | |
| 6,748,057 B2 | 6/2004 | Ranalli et al. | |
| 6,839,421 B2 | 1/2005 | Ferraro Esparza et al. | |
| 7,240,068 B2 * | 7/2007 | Hsu et al. ........................ 1/1 |
| 7,720,997 B1 * | 5/2010 | Gourlay et al. ............ 709/245 |
| 7,848,311 B2 * | 12/2010 | Miyajima et al. .......... 370/352 |
| 7,856,094 B2 * | 12/2010 | Khadri et al. ............... 379/219 |
| 7,864,709 B2 * | 1/2011 | Cheshire ..................... 370/255 |
| 2003/0007482 A1 | 1/2003 | Khello et al. | |
| 2003/0128693 A1 * | 7/2003 | Segal ........................... 370/352 |
| 2004/0254926 A1 * | 12/2004 | Balogh ............................ 707/4 |
| 2005/0074016 A1 * | 4/2005 | Dekeyser ..................... 370/401 |
| 2005/0135337 A1 * | 6/2005 | Nabeta et al. .............. 370/352 |
| 2005/0141530 A1 * | 6/2005 | Miyajima et al. .......... 370/401 |
| 2005/0182781 A1 * | 8/2005 | Bouvet ........................ 707/102 |

(Continued)

FOREIGN PATENT DOCUMENTS

CN ZL 200780034932.6 3/2012

OTHER PUBLICATIONS

Notification of Transmittal of the International Search Report and the Written Opinion of the International Searching Authority, or the Declaration for International Application No. PCT/US07/16471 (Feb. 27, 2008).

(Continued)

*Primary Examiner* — Hassan Phillips
*Assistant Examiner* — Ajay Cattungal
(74) *Attorney, Agent, or Firm* — Jenkins, Wilson, Taylor & Hunt, P.A.

(57) ABSTRACT

The subject matter described herein includes methods, systems, and computer program products for specifying an ENUM service type in a communications network that uses a plurality of different ENUM service types. According to one method, at least one ENUM service type is identified from a plurality of different ENUM service types. The identification is performed at a signaling point separate from an ENUM database. An ENUM query message corresponding to the at least one identified ENUM service type is generated. The ENUM query message is transmitted to an at least one ENUM server for providing the at least one identified ENUM service type.

18 Claims, 10 Drawing Sheets

U.S. PATENT DOCUMENTS

| | | | |
|---|---|---|---|
| 2006/0129665 A1* | 6/2006 | Toebes et al. | 709/223 |
| 2006/0165060 A1* | 7/2006 | Dua | 370/352 |
| 2007/0180485 A1* | 8/2007 | Dua | 725/114 |
| 2008/0165706 A1* | 7/2008 | Bozionek | 370/259 |
| 2008/0260119 A1* | 10/2008 | Marathe et al. | 379/93.01 |
| 2010/0095337 A1* | 4/2010 | Dua | 725/110 |

OTHER PUBLICATIONS

First Office Action for Chinese Patent Application No. 200780034932.6 (Mar. 2, 2011).

Communication of European publication number and information on the application of Article 67(3) EPC for European Application No. 07836168.0 (Mar. 18, 2009).

Mealling, "Dynamic Delegation Discovery System (DDDS) Part Four: The Uniform Resource Identifiers (URI) Resolution Application," RFC 3404, pp. 1-17 (Oct. 2002).

Mealling, "Dynamic Delegation Discovery System (DDDS) Part Two: The Algorithm," RFC 3402, pp. 1-16 (Oct. 2002).

Mealling, "Dynamic Delegation Discovery System (DDDS) Part One: The Comprehensive DDDS," RFC 3401, pp. 1-7 (Oct. 2002).

Faltstrom, "E.164 number and DNS," RFC 2916, pp. 1-11 (Sep. 2000).

Notice of Granting Patent Right for Invention for Chinese Application No. 200780034932.6 (Oct. 31, 2011).

\* cited by examiner

```
;; HEADER SECTION
;; id = 41555
;; qr = 0   opcode = QUERY   aa = 0   tc = 0   rd = 0
;; ra = 0   ad = 0   cd = 0   rcode = NOERROR
;; qdcount = 1   ancount = 0   nscount = 0   arcount = 1

;; QUESTION SECTION (1 record)
;; 1.4.3.2.4.3.2.4.3.2.1.e164.arpa.   IN   NAPTR

;; ANSWER SECTION (0 records)

;; AUTHORITY SECTION (0 records)

;; ADDITIONAL SECTION (1 records)
   mailto

End of packet sent
```

FIG. 2

```
;; HEADER SECTION
;; id = 41555
;; qr = 1    opcode = QUERY   aa = 1   tc = 0   rd = 1
;; ra = 1    ad = 0   cd = 0   rcode = NOERROR
;; qdcount = 1   ancount = 3   nscount = 1   arcount = 0

;; QUESTION SECTION (1 record)
;; 1.4.3.2.4.3.2.4.3.2.1.e164.arpa.    IN   NAPTR ;; ANSWER SECTION (3 records)
1.4.3.2.4.3.2.4.3.2.1.e164.arpa.    0   IN   NAPTR   5688 39270 "U" "mms+E2U"
"!^.*$!mailto:+12342342341/PPMN@mmsc.mycarrier.com!" .
1.4.3.2.4.3.2.4.3.2.1.e164.arpa.    0   IN   NAPTR   5688 39994 "U" "mms+E2U"
"!^.*$!mailto:+12342342341/PPMN@mmsc2.mycarrier.com!" .
1.4.3.2.4.3.2.4.3.2.1.e164.arpa.    0   IN   NAPTR   5699 25 "U" "mms+E2U"
"!^.*$!mailto:+12342342341/PPMN@mmsc3.mycarrier.com!" .

;; AUTHORITY SECTION (1 record)
1.e164.arpa.    0   IN   NS   cary-c.

;; ADDITIONAL SECTION (0 records)
```

METHODS, SYSTEMS, AND COMPUTER PROGRAM PRODUCTS FOR SPECIFYING A PARTICULAR ENUM SERVICE TYPE IN A COMMUNICATIONS NETWORK THAT UTILIZES A PLURALITY OF DIFFERENT ENUM SERVICE TYPES

RELATED APPLICATIONS

This application claims the benefit of U.S. Provisional Patent Application Ser. No. 60/832,215, filed Jul. 20, 2006; the disclosure of which is incorporated herein by reference in its entirety.

TECHNICAL FIELD

The subject matter described herein relates to E.164 number mapping (ENUM). More particularly, the subject matter described herein relates to methods, systems, and computer program products for specifying a particular ENUM service type for a call or other communication in a communications network that utilizes a plurality of different ENUM service types.

BACKGROUND

Presently, one concern regarding Internet Protocol (IP) telephony is the need for seamless integration with a public switched telephone network (PSTN). Because several different signaling protocols are currently being utilized to access the PSTN, it is important for any integrated solution to be able to support all of the various protocols. In general, it may be useful to have one unifying identifier number tied to all of the services (e.g., phone call, electronic mail, web, etc.) that may be used to establish contact with a given subscriber. For example, an E.164 number, which is defined by ITU-T standards, may be designated as a unifying identifier number. An E.164 number is commonly used in E.164 telephone number mapping (ENUM) systems that associate the E.164 number to a number of URI addresses through which a called party subscriber may be contacted.

ENUM systems typically utilize DNS queries to obtain translation data (i.e., URI addresses) for a given dialed number (i.e., the unifying identifier number). As new services are added (e.g., text messages, voice messages, video, IMS communications, etc.), the number of DNS queries thattraverse the IP network will also increase. Also, as the number of services are expanded, the number of URI addresses utilized by subscribers will continue to grow, and thus, will be included in response messages. Consequently, one problem that arises is that a message generated in response to a query message may include more services (both in number and service type) than the query initiator desires. For example, a query initiator may desire only mailto URI addresses because the calling party may only be able to communicate via electronic mail. In this scenario, including URI addresses related to other services in the response message(s) is not needed and therefore unnecessarily consumes network resources. Thus, it would be ideal to limit the response message content in order to decrease the overall bandwidth utilized for transmitting the response.

Accordingly, there exists a need for improved methods, systems, and computer program products for specifying an ENUM service type in a communications network that utilizes a plurality of different ENUM service types.

SUMMARY

The subject matter described herein includes methods, systems, and computer program products for specifying an ENUM service type in a communications network that uses a plurality of different ENUM service types. According to one method, at least one ENUM service type is identified from a plurality of different ENUM service types. The identification is performed at a signaling point separate from an ENUM database. An ENUM query message corresponding to the at least one identified ENUM service type is generated. The ENUM query message is transmitted to an at least one ENUM server for providing the at least one identified ENUM service type.

BRIEF DESCRIPTION OF THE DRAWINGS

Preferred embodiments of the subject matter described herein will now be explained with reference to the accompanying drawings of which.

DETAILED DESCRIPTION

Figure 1A:
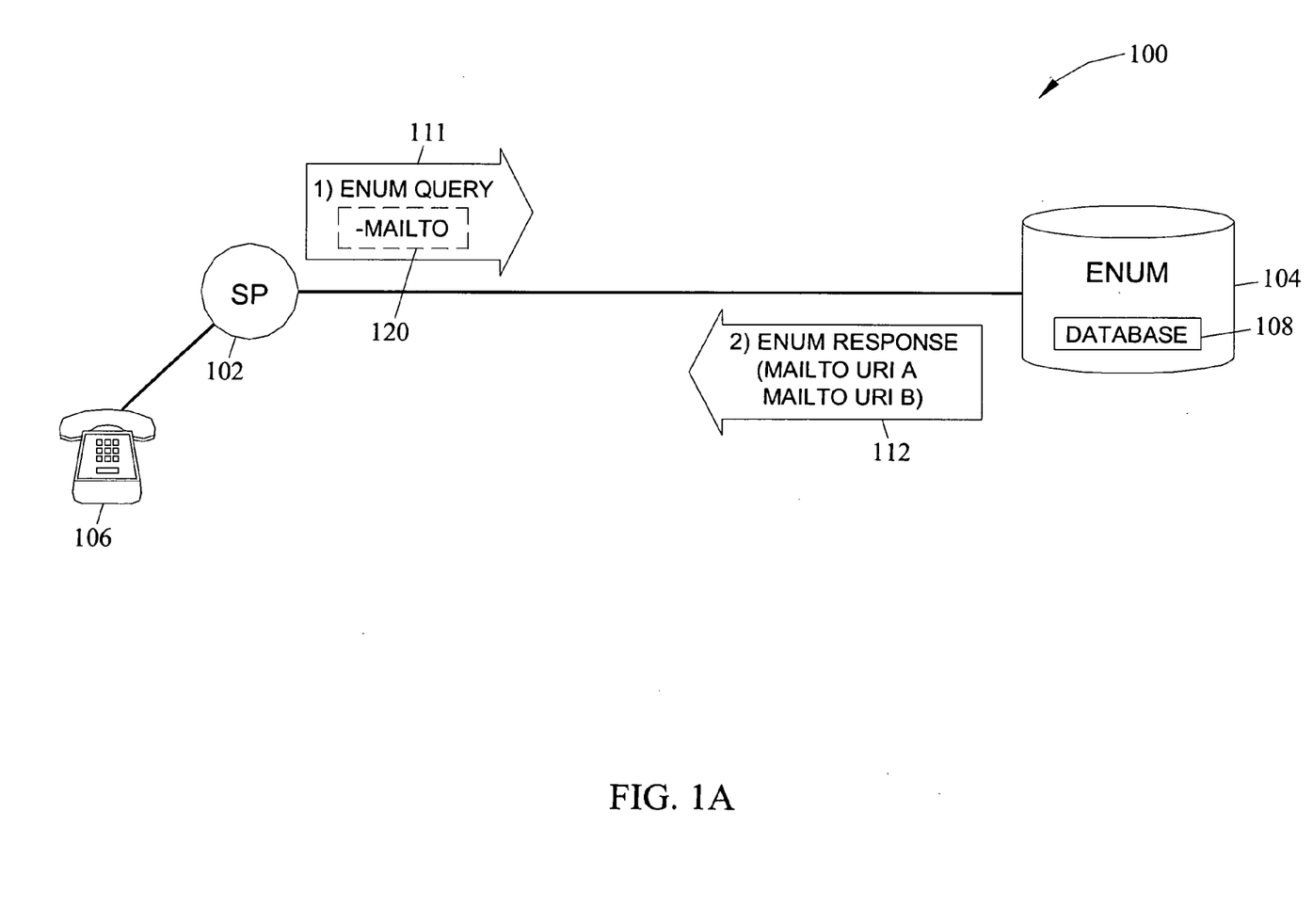
FIG. 1A is a network diagram illustrating an exemplary communications network adapted to specify an ENUM service type in a communications network according to an embodiment of the subject matter described herein.

The present subject matter relates to methods, systems, and computer program products for specifying a particular ENUM service type in a communications network that utilizes a plurality of different ENUM service types. FIG. 1 illustrates an exemplary communications network 100 in which the present subject matter may be implemented according to an embodiment of the subject matter described herein.

Referring to FIG. 1A, network 100 may include a signaling point 102, an ENUM server 104, and at least one client device 106. Signaling point 102 may include a telephone central office switch that connects to client device 106. In one embodiment, signaling point 102 may include a device called a Class 5 switch or TDM switch, or any other network device configured for TDM-based, circuit-switched telephone calls (e.g., an SS7 service switching point (SSP)). In an alternate embodiment, signaling point 102 may be an IP-based element, such as an IP multimedia subsystem (IMS) call session control function (CSCF), a media gateway controller (MGC), a softswitch, a next generation network (NGN) node, an application server, a service control point, a mobile switching center (MSC) server, a home location register (HLR), an IMS home subscriber server (HSS), a presence server, a SIP proxy server, or an H.323 gatekeeper. ENUM server 104 may include a database 108 that contains a plurality of telephone numbers, URI addresses, etc., that a calling party may possibly use to contact the called party. In one exemplary implementation, database 108 may include E.164 number-to-URI mappings for a plurality of different ENUM service types. For example, database 108 may include E.164 number-to-mailto URIs for an email ENUM service type, E.164 number-to-SIP URIs for a voice call ENUM service type, and E.164 number-to-instant messaging URIs for an IM ENUM service type. Client device 106 may include a conventional telephone, an Internet Protocol (IP) telephone, a computer, or any other like device capable of communicating with SP 102. The subject matter described herein is not limited to implementations where SP 102 is connected to a user device. In an alternate implementation, SP 102 may be a PSTN tandem office or IP equivalent that connects to other signaling points.

In FIG. 1A, signaling point 102 detects a communication origination event (e.g., a call placed by client device 106). In response to the event, signaling point 102 may identify an origination address (e.g., calling party's phone number) and a destination address (e.g., the called party's E.164 number). Upon detecting the communications origination event message, signaling point 102 is configured to determine whether ENUM service is required, and, if so, to generate a query message, (e.g., ENUM query message 111), which is sent to a translation server (e.g., ENUM server 104) in order to obtain at least one URI in which the subscriber may be reached. Signaling point 102 may determine whether ENUM service is required based on the media type of the destination. For example, if the destination is an IP device, ENUM service may be required to translate the E.164 number of the destination to a URI or other suitable IP-based identifier.

Figure 1B:
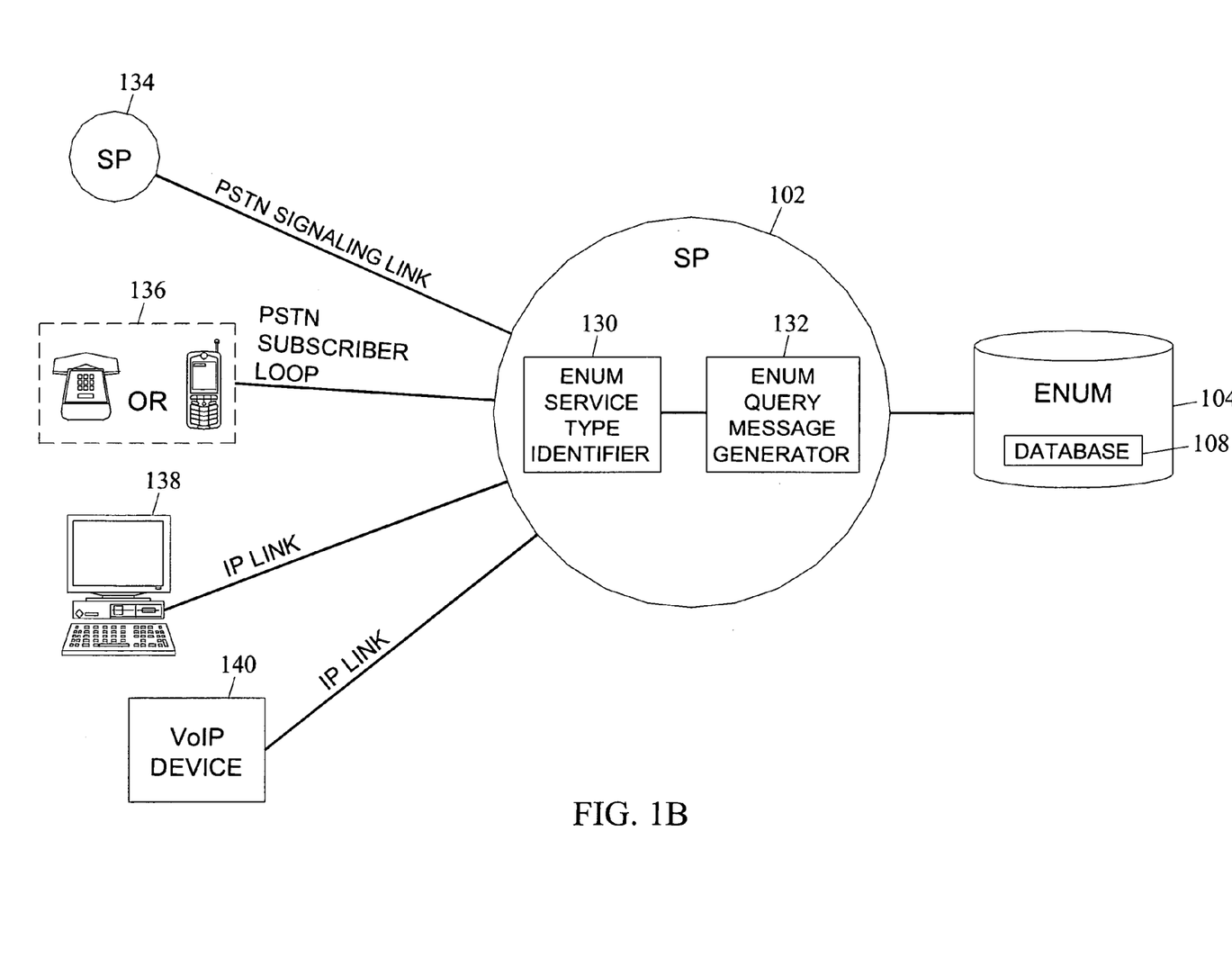
FIG. 1B is a network diagram illustrating exemplary details of signaling point 102 for identifying an ENUM service type according to an embodiment of the subject matter described herein.

In one embodiment, ENUM query message 111 includes both the called party's E.164 number (not shown) and a service type indicator 120 corresponding to an ENUM service type identified by signaling point 102. Signaling point 102 may identify the ENUM service type in any suitable manner. For example, as illustrated in FIG. 1B, SP 102 may include an ENUM service type identifier 130 for identifying at least one ENUM service type in a network that utilizes a plurality of ENUM service types and an ENUM query message generator 132 that formulates and sends ENUM queries according to the at least one identified ENUM service type. In one implementation, for communications for which SP 102 receives a signaling message, ENUM service type identifier 130 may identify the ENUM service type based on the content of the received signaling message. For example, if an ISDN user part (ISUP) message is received from another SP 134 over a PSTN signaling link, ENUM service type identifier 130 may determine that the communication is a voice call to an IP phone and may instruct ENUM query message generator 132 to construct an ENUM query requesting a SIP URI. In another example where SP 102 is a PSTN end office, SP 102 may detect call originations from subscriber devices 136, may identify the ENUM service type as a voice call to an IP phone, and may instruct ENUM query message generator 132 to construct an ENUM query requesting SIP URIs. In yet another example, an SP may receive a messaging service message (e.g., short message service message, instant message, multimedia message), and determine based on the message type or message payload, which ENUM service type to request (e.g., mailto URI). In yet another example, ENUM service type identifier may receive an SMTP or POP3 message from computer 138 via an IP link, may identify the ENUM service type as email, and may instruct ENUM query message generator 132 to request mailto URIs. In yet another example, ENUM service type identifier 130 may receive a SIP message from VoIP device, may examine the context type field in the SIP message to determine the ENUM service type, and may instruct ENUM query message generator 132 to formulate an ENUM query corresponding to the identified context type. Thus, ENUM service type identifier 130 may identify the ENUM service type based on context of signaling messages and/or type of communication link from which a communication is received.

Returning to FIG. 1A, ENUM query message 111 may contain a E.164 number in reversed dotted notation, as specified by ENUM standards. For example, if the E.164 number is 9194605500, the format of the E.164 number in query message 111 may be 0.0.0.0.5.5.0.6.4.e164.arpa. The properly formatted E.164 number in addition to service type indicator 120 may be used to index ENUM database 108 in embodiments in which ENUM database 108 includes ENUM data for plural ENUM service types. Service type indicator 120 may include any type of marker used to specify the particular type of URIs requested by SP 102. Determination of service type indicator 120 may be made by either the caller or signaling point 102. In one embodiment, a calling party may want to limit the call session to a certain type or types of media. For example, the calling party may have the capability to conduct a voice call or email communications to a particular E.164 number, but may not want to utilize the voice call functionality for a particular communication. Thus, the user may request URIs that do not involve voice call functionality, such as designating the service type indicator as a mailto indicator only.

As described above with respect to FIG. 1B, signaling point 102 may be configured to determine the ENUM service type. For instance, signaling point 102 may be configured to inspect certain fields in a received SIP message, such as the context type. Thus, if signaling point 102 determines that only mailto URIs are needed, then signaling point 102 inserts a mailto ENUM service type indicator 120 into query message 111 and forwards the message to ENUM server 104. Upon receiving message 111, ENUM server 104 performs a lookup in database 108 using the called E.164 number and service type indicator 120. ENUM server 104 locates and returns all the database entries that are associated with the service type indicated by the service type indicator (e.g., mailto, SIP, etc.) and the subscriber identifier (i.e., subscriber's E.164 number). For example, instead of returning all of the URIs associated with the subscriber identifier to requesting signaling point 102, ENUM server 104 may be configured to return only the (subscriber related) URIs of the type indicated by service type indicator 120 in message 111. To illustrate, FIG. 1A shows that a mailto service type indicator 120 is included in ENUM query message 111, which is forwarded to ENUM server 104. Because query message 111 includes a mailto service type indicator, only mailto URI addresses (e.g., MAIL TO URI A and MAIL TO URI B in ENUM response 112) are returned to the signaling point 102 by ENUM server 104. In this particular scenario, only mailto URIs are included in response message 112. After receiving response message 112, signaling point 102 then forwards a call signaling message to at least one of the URIs indicated in message 112.

Figure 2:
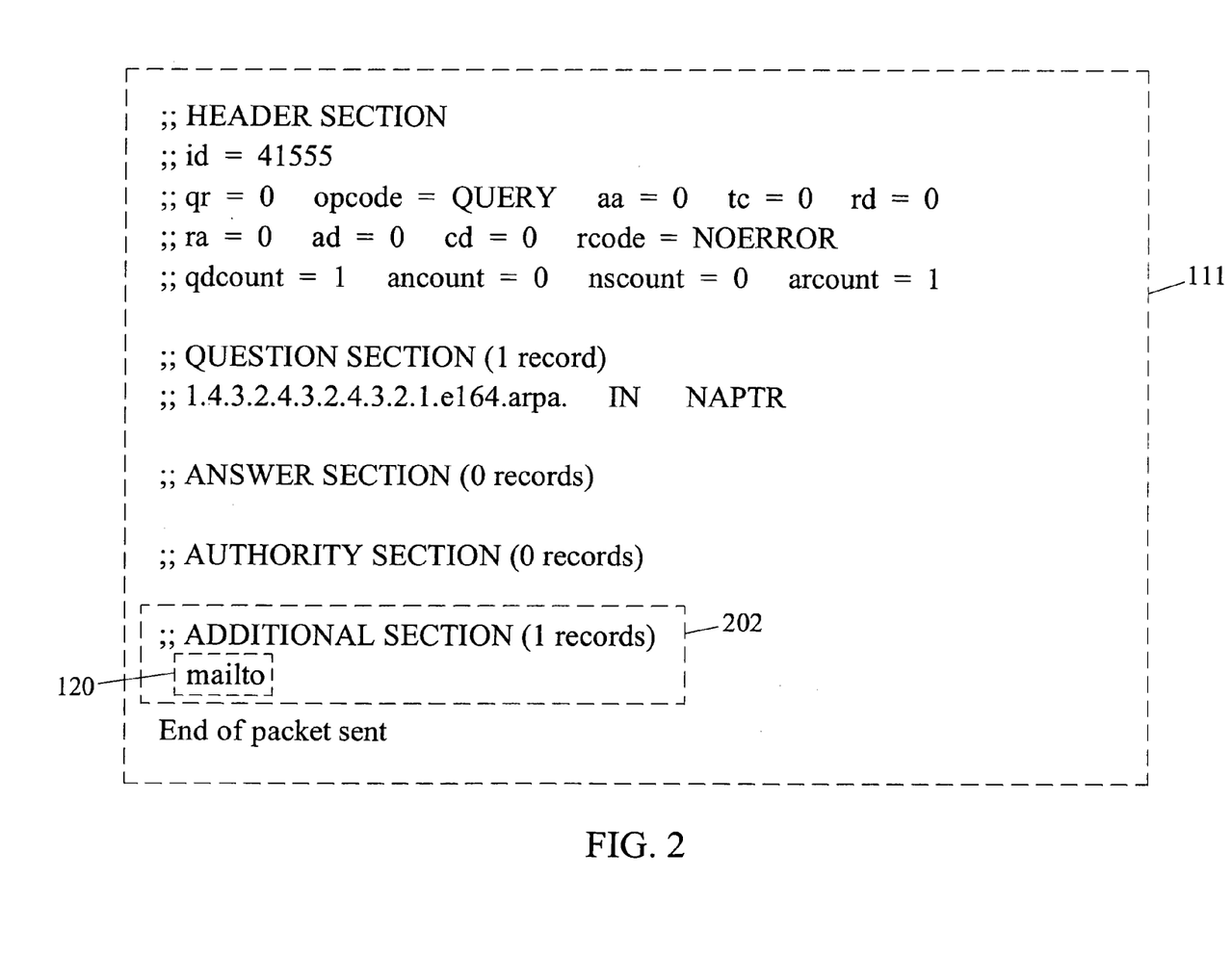
FIG. 2 is a diagram illustrating an exemplary ENUM query message according to an embodiment of the subject matter described herein.

FIG. 2 depicts an exemplary query message 111 that may be generated by signaling point 102 according to an embodiment of the subject matter described herein. In one embodiment, query message 111 includes an ENUM query message that contains an ENUM service type indicator 120. For example, the mailto service type indicator 120 may be included in the additional section 202 of query message 111. Namely, the additional section enables a user to include a list of desired services (e.g., the manner in which the call should be connected). By utilizing a service type indicator to restrict the type of URIs that may be used to complete the call or communications transaction in the query message, the response message containing the relevant URIs will be smaller and will only provide the data needed for specific services. In an alternate embodiment, service type indicator 120 may be placed in another section of query message 111. Otherwise, the response message would return all the URI addresses available to contact the called subscriber.

In addition to reducing the amount of ENUM data being transferred, one implementation of the present subject matter which includes an ENUM database that contains ENUM data for plural ENUM service types provides additional advantages. For example, by utilizing this implementation, one large database with all services combined together may be used instead of having individual databases for each service. This can save on the number of databases needed can and also save bandwidth (e.g., DNS queries on the internet account for a large percentage of all traffic). It also provides far end devices a single location to direct a query message to receive ENUM data for plural ENUM service types.

Figure 3:
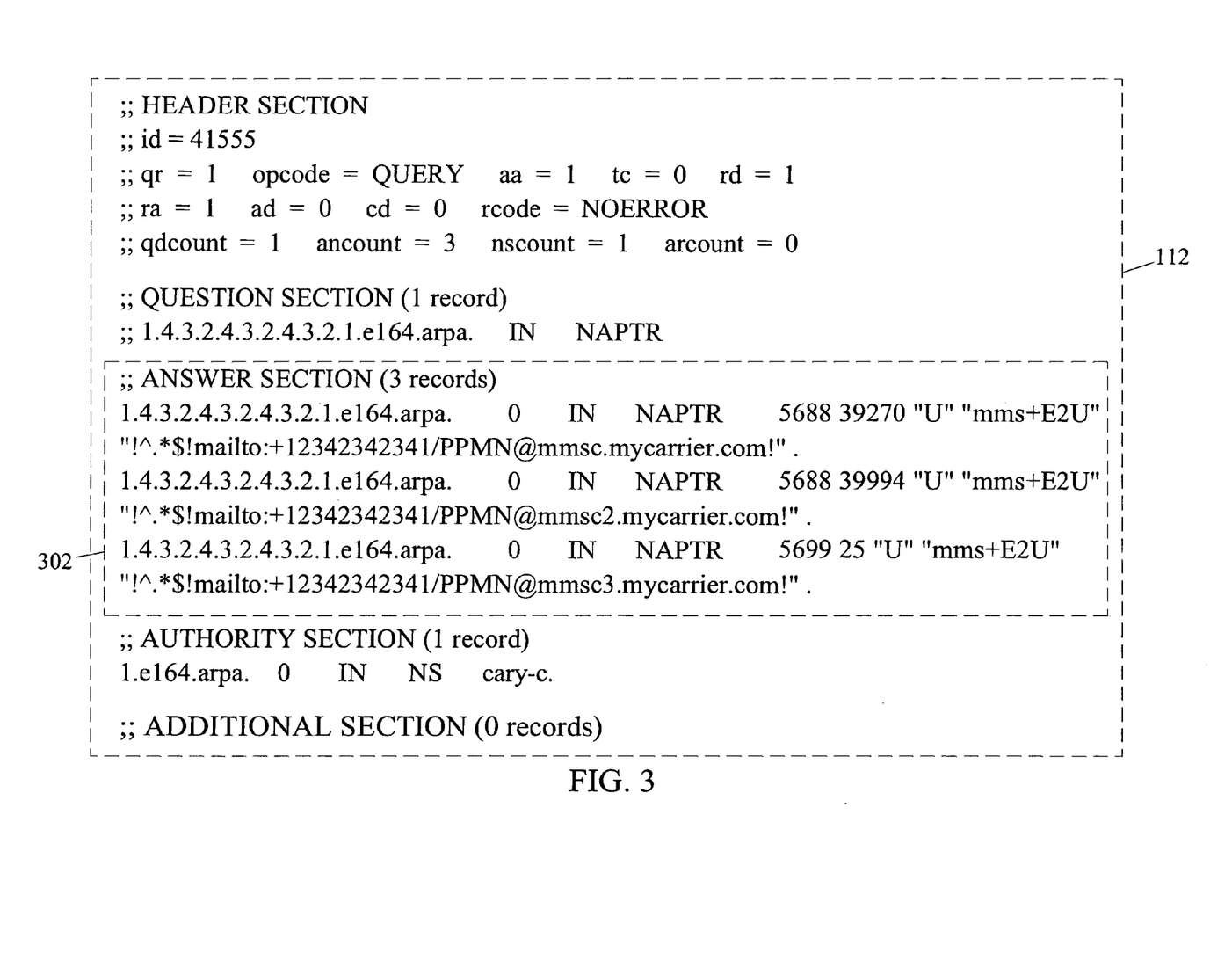
FIG. 3 is a diagram illustrating an exemplary ENUM response message according to an embodiment of the subject matter described herein.

FIG. 3 depicts an exemplary response message 112 that may be generated by ENUM server 104 in response to receiving an ENUM query with a service type indicator according to an embodiment of the subject matter described herein. In one embodiment, response message 112 includes an ENUM response message to ENUM query message 111 illustrated in FIG. 2. Referring to FIG. 3, response message 112 includes an answer section 302 that only contains mailto URI addresses that are returned by the ENUM database 120 (per the ENUM service type identified in query message 111). Specifically, answer section 302 of response message 112 is used to list the requested URI types. Referring to FIG. 3, section 302 is shown to include three URI addresses, which are all of the mailto URI type (as requested by query 102). In an alternate embodiment, these URIs may be placed in another section of response message 112. Response message 112 may also include a list of the services in the additional section. By including the service information in the additional section, multiple response messages may be generated in response to a single query. For example, one response message containing a SIP URI, one response containing a mailto URI, and one response with the combination of a SIP URI and a mailto URI may be generated. This allows the division of the response into multiple responses as needed. The originator of the query messages may subsequently combine the URIs from all of the responses into a complete listing for delivery to the subscriber or to another network device.

Figure 4:
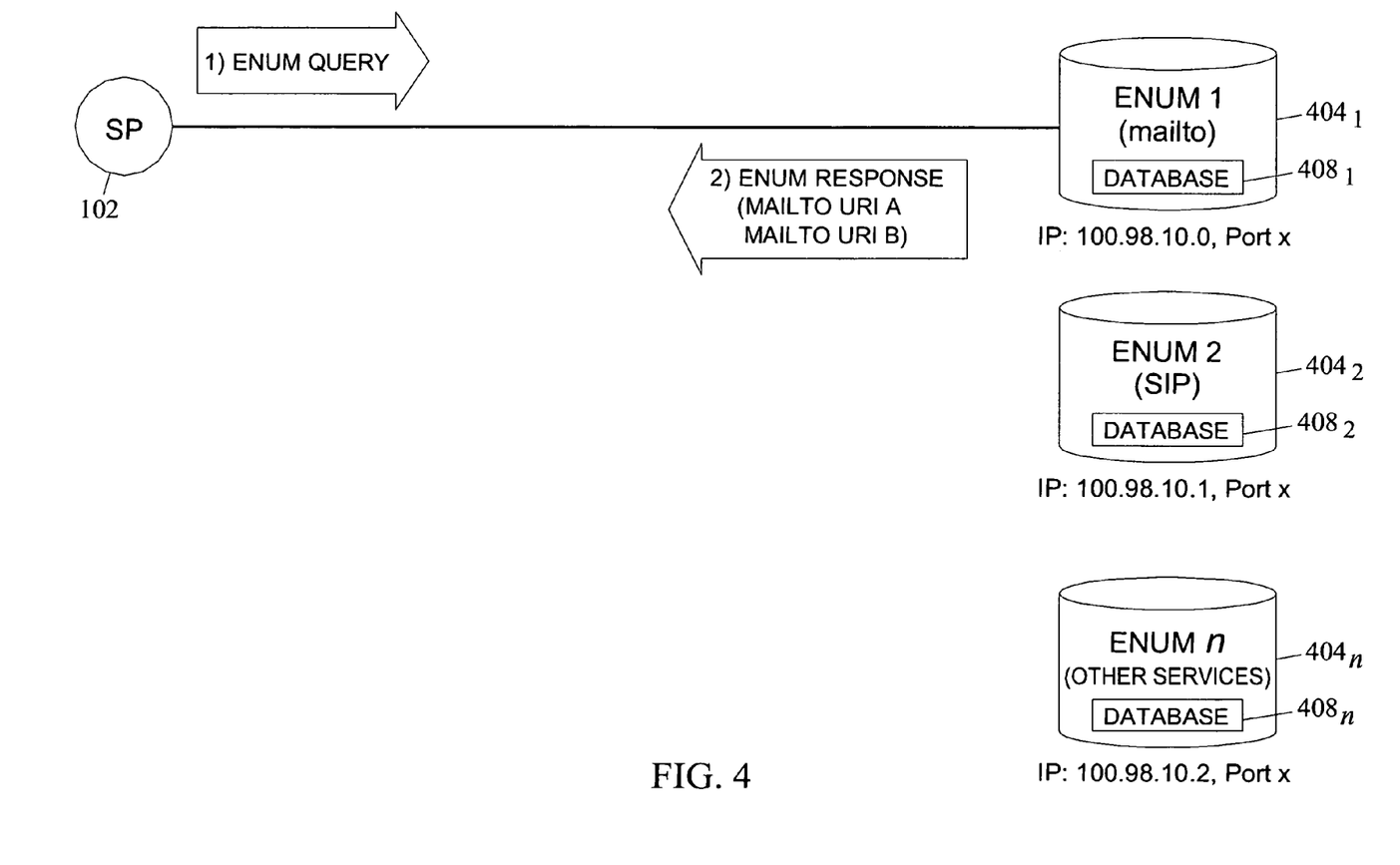
FIG. 4 is a network diagram illustrating an exemplary communications network that transmits an ENUM query to an ENUM database that provides a specific type of ENUM service type among a plurality of ENUM databases that provide different ENUM types according to an embodiment of the subject matter described herein.

In the embodiment illustrated in FIG. 1A, SP 102 inserts an ENUM service type indicator in an ENUM query and forwards the ENUM query to a single ENUM database that contains ENUM data for plural services. In an alternate embodiment, SP 102 may determine the required ENUM service type and send the ENUM query an ENUM database of a plurality of service specific ENUM databases corresponding to the identified ENUM service type. FIG. 4 illustrates such an embodiment. In FIG. 4, SP 102 determines or identifies an ENUM service type as described above. SP 102 then forwards the ENUM query to one of ENUM databases $404_1$-$404_n$ containing service specific ENUM data $408_1$-$408_n$. In the illustrated example, the ENUM query is sent to ENUM database $404_1$, which contains only mailto URIs. The ENUM response consequently includes mailto URIs and excludes SIP and other service URIs.

Figure 5:
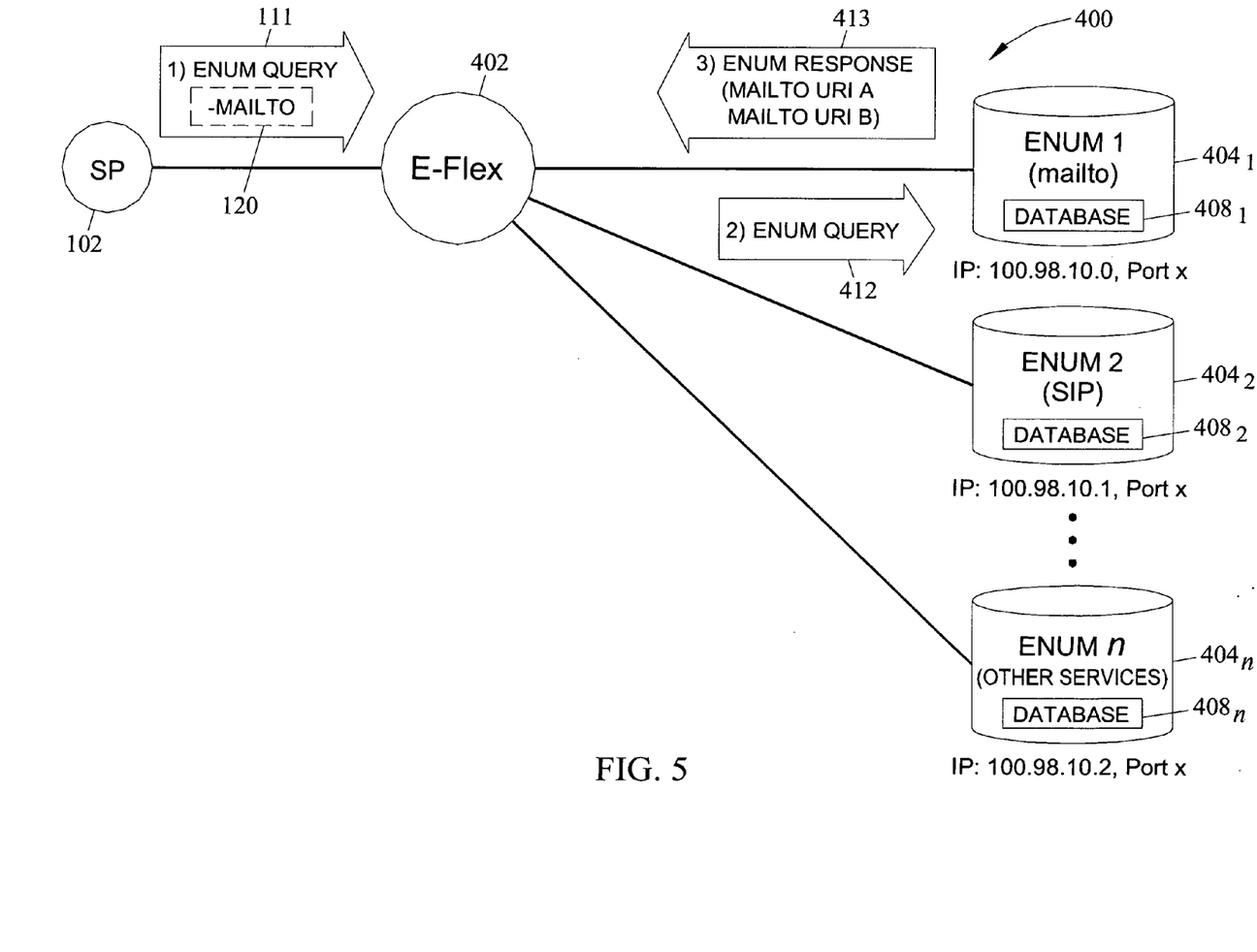
FIG. 5 is a network diagram illustrating an exemplary communications network that utilizes a signaling message routing node, referred to herein as an ENUM flexible routing node or E-Flex node, adapted to obtain an ENUM response from a single ENUM server for providing a specific type of ENUM server among plural ENUM servers providing different types of ENUM service according to an embodiment of the subject matter described herein.

In the embodiments illustrated in FIGS. 1A and 4, SP 102 sends the ENUM query directly to an ENUM database. In an alternate embodiment, an intermediate node, referred to herein as the E-Flex or ENUM flexible routing node, may receive an ENUM query and send a modified ENUM query or queries to one or more ENUM databases. In FIG. 5, E-Flex node 402 receives an ENUM query with an ENUM service type indicator indicating that only mailto URIs are desired. In response to the query, E-Flex node 402 may examine the ENUM service type indicator and generate a new ENUM query 412 or a modified version of ENUM query without the service type indicator and transmit the new or modified query to mailto ENUM database $404_1$. E-Flex node 402 may receive ENUM response 413 containing the mailto URIs and forward the response to SP 102.

Figure 6:
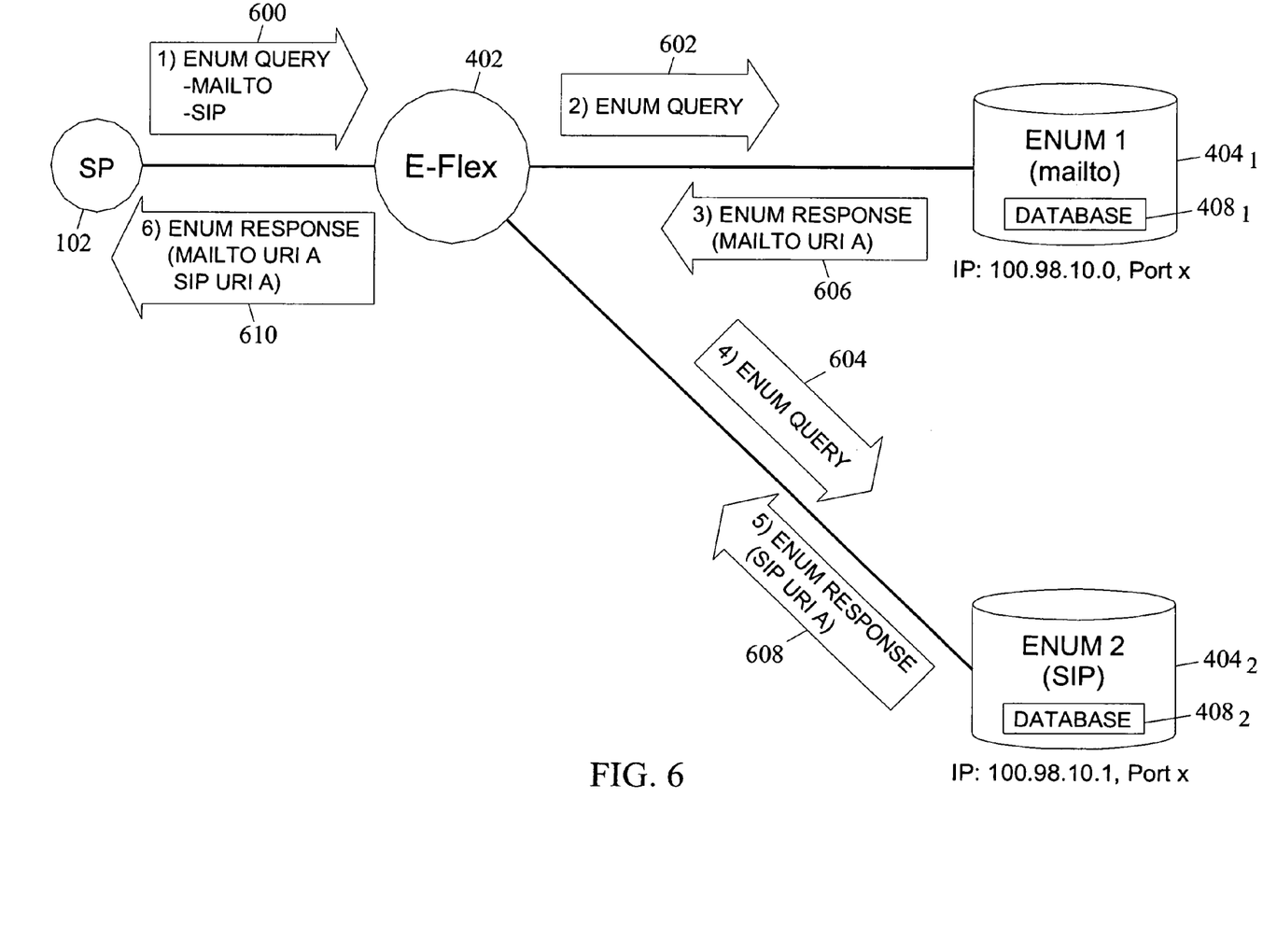
FIG. 6 is a network diagram illustrating an exemplary communications network that utilizes an E-Flex node to obtain ENUM responses from multiple ENUM servers according to an embodiment of the subject matter described herein.

In the embodiment illustrated in FIG. 6, E-Flex node 402 receives an ENUM query with ENUM service type indicators indicating a plurality of different URI types are desired. In response to receiving such a query, E-Flex node 402 examines the service type indicators and formulates plural ENUM queries 602 and 604 to ENUM databases $404_1$ and $404_2$, which correspond to the indicated ENUM service types. E-Flex node 402 also receives ENUM responses 606 and 608, combines the URIs from the responses, and formulates a new ENUM response 610 to SP 102 containing ENUM URIs of both service types. In such an embodiment, E-Flex routing node 402 may maintain state information, such as a transaction ID and a timer so that responses to ENUM queries can be associated with an original query and sent the appropriate query originator. The timer may be used for requesting retransmissions of ENUM responses in the event that the ENUM responses are not received within a time period.

Figure 7:
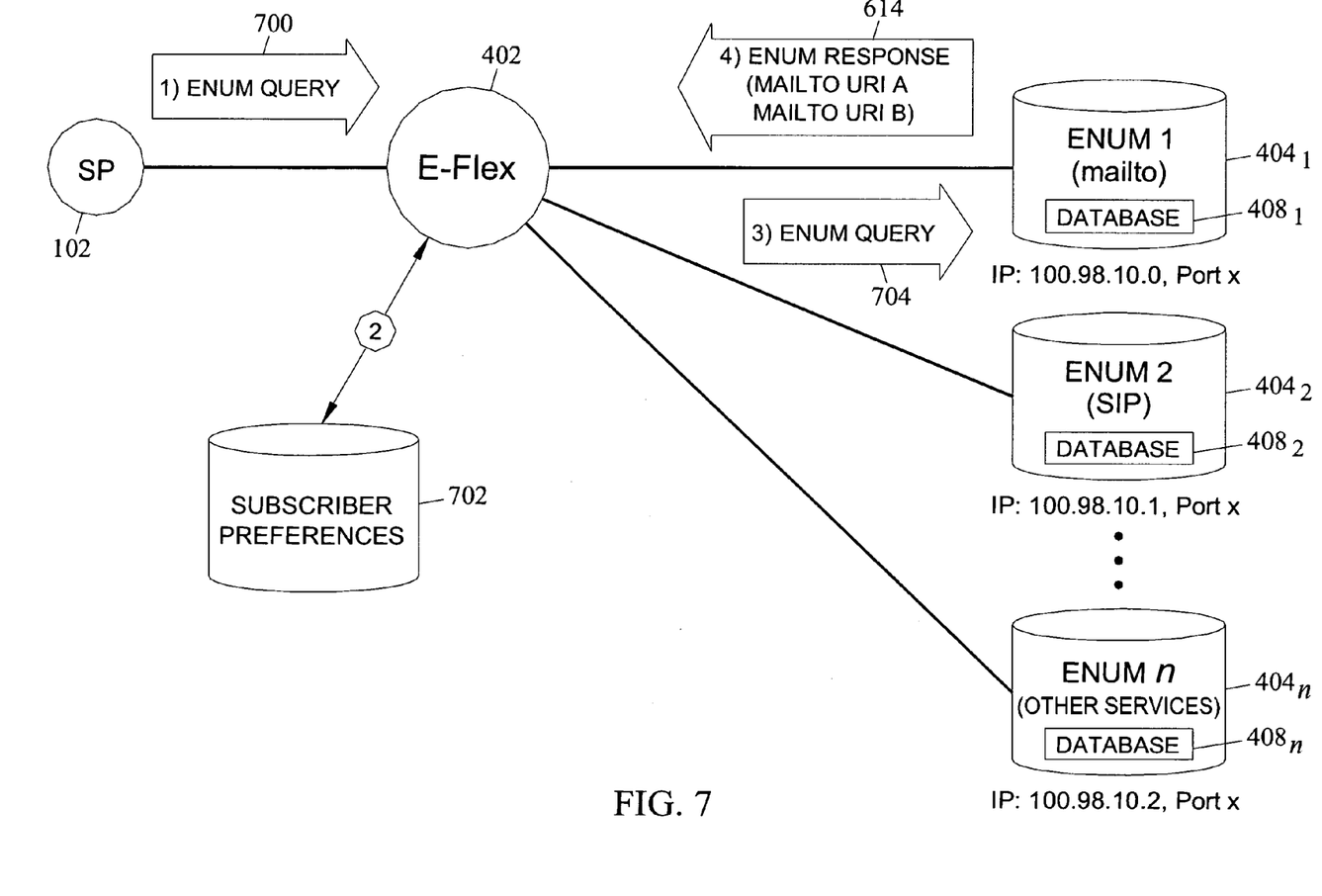
FIG. 7 is a network diagram illustrating exemplary communications network that utilizes an E-Flex node and a subscriber preferences database to obtain ENUM responses of specific ENUM service types in accordance with a subscriber's preferences according to an embodiment of the subject matter described herein.

In yet another alternate embodiment of the subject matter described herein, E-Flex routing node 402 may utilize subscriber preference data in determining the appropriate ENUM service type. FIG. 7 illustrates such an embodiment. In FIG. 7, E-Flex node 402 receives an ENUM query 700. ENUM query 700 may not include a service type indicator. E-Flex node 402 may extract called or calling subscriber preferences from a subscriber preferences databases 702. The subscriber preferences may identify ENUM service types for the called or calling subscriber. Accordingly, E-Flex node 402 may send a new or modified ENUM query 704 to an ENUM database corresponding to the selected service type. In an alternate implementation, E-Flex node 402 may send the ENUM query message to an ENUM database that provides the subscriber-preferred ENUM service type among ENUM databases that provide different ENUM service types.

Figure 8:
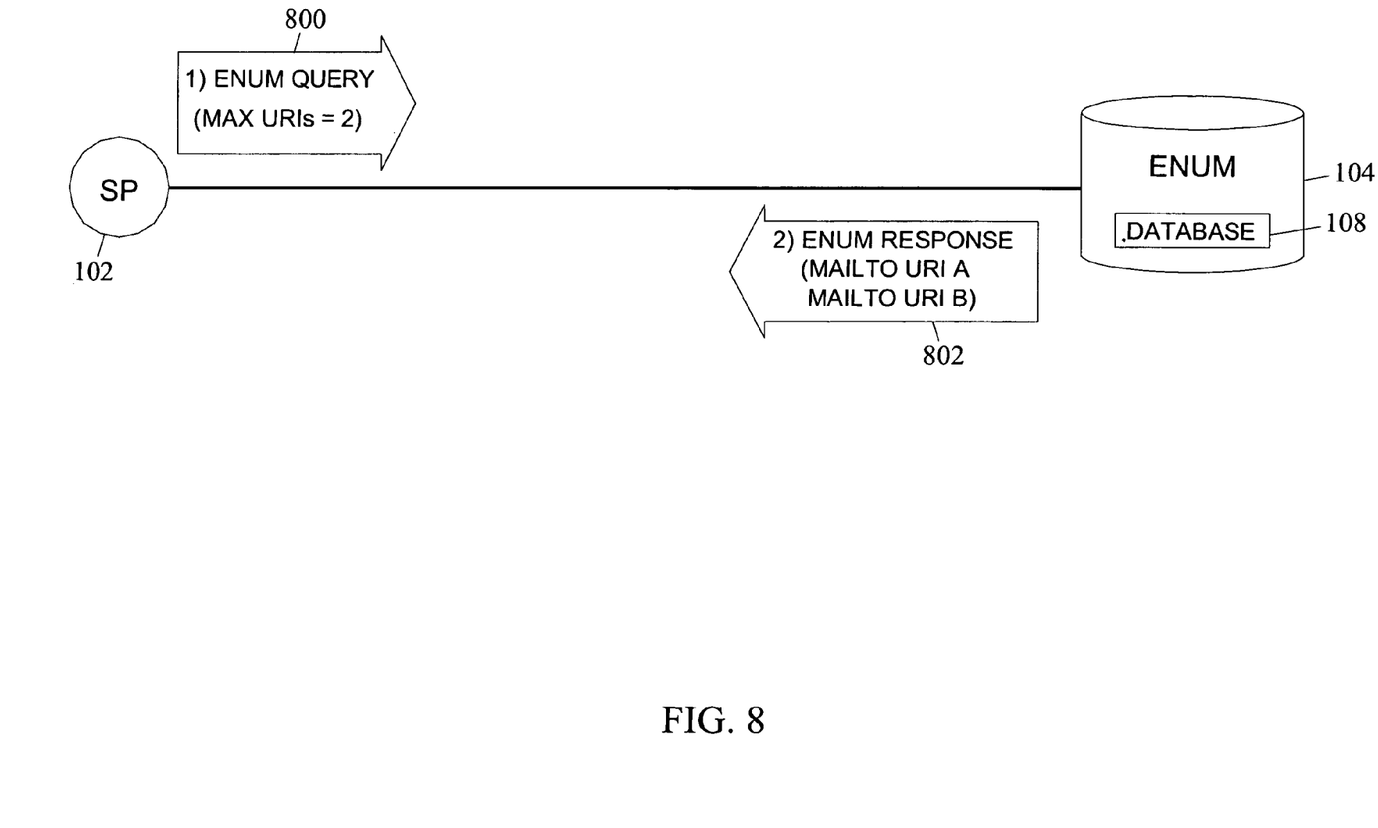
FIG. 8 is a network diagram illustrating an exemplary communications network that utilizes a signaling point to specify and obtain a maximum number of ENUM responses in accordance according to an embodiment of the subject matter described herein.

According to another aspect of the subject matter described herein, an originating signaling point and/or E-Flex node 402 may insert a max URIs parameter in an ENUM query message. The max URIs parameter may specify the maximum number of URI records that are to be returned for a query. The max URIs parameter may be included, for example, in the additional section of an ENUM query and may be specified per service type or as an overall total record or URI record limit. FIG. 8 illustrates such an embodiment. In FIG. 8, SP 102 formulates an ENUM query 800 containing a max URIs parameter specifying that only two URIs are desired. SP 102 sends the ENUM query to ENUM server 104. ENUM server 104 may use the max URIs parameterto limit the number of records returned from database 108. Accordingly, ENUM server 104 may formulate an ENUM response 802 containing a number of URIs corresponding to the maximum number of URIs. The max URIs parameter may also be inserted by an intermediate node, such as E-Flex node 402 (now shown in FIG. 8), based on subscriber preference or other information.

Figure 9:
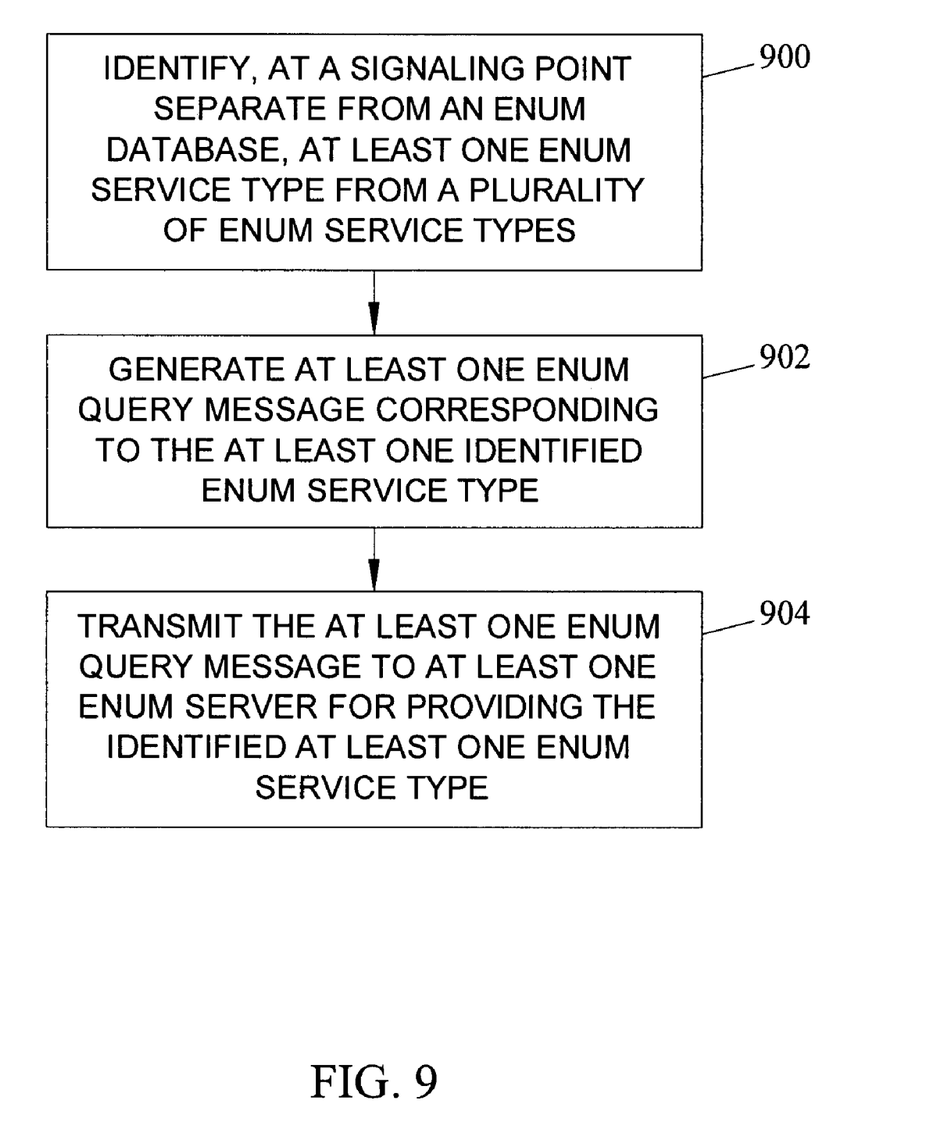
FIG. 9 is a flow chart illustrating exemplary steps for identifying and specifying an ENUM service type in a communications network according to an embodiment of the subject matter described herein.

FIG. 9 is a flow chart illustrating exemplary overall steps that may be implemented in identifying an ENUM service type according to an embodiment of the subject matter described herein. Referring to FIG. 9, in step 900, at least one ENUM service type is identified from a plurality of different ENUM types. The ENUM service type is identified at a signaling point separate from an ENUM database. For example, the ENUM service type may be identified by an originating node, such as SP 102, or at an intermediate node, such as E-Flex node 402. The identified ENUM service type may be a specific ENUM service type, such as an email ENUM service type or a voice call ENUM service type, or an instant messaging ENUM service type.

In step 902, at least one ENUM query message is generated, where the at least one ENUM query message corresponds to the at least one identified ENUM service type. For example, the at least one query message may include one or more service type indicators corresponding to the at least one identified ENUM service type. In one implementation, plural ENUM query messages for plural identified ENUM service types may be generated.

In step 904, the ENUM query message is transmitted to at least one ENUM server for providing the identified at least one ENUM service type. If the ENUM query message includes a service type indicator, the ENUM query message may be transmitted to an ENUM server that contains ENUM data for plural service types. In an alternate implementation, the service type indicator may be omitted, and the ENUM query message or messages may be sent to a service-type-specific ENUM server.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for specifying an E.164 number mapping (ENUM) service type in a communications network that utilizes a plurality of different ENUM service types, the method comprising:
   detecting, at a signaling point separate from an ENUM database, a communication origination event for establishing communication with a called party destination;
   identifying, at the signaling point separate from the ENUM database, at least one ENUM service type from a plurality of different ENUM service types based on a media type associated with the called party destination;
   generating at least one ENUM query message that includes at least one ENUM service type identifier that identifies the at least one identified ENUM service type; and
   transmitting the at least one ENUM query message to at least one ENUM server that is configured to utilize the at least one ENUM service type identifier to locate at least one destination identifier for establishing the communication with the called party destination via the at least one identified ENUM service type.

2. The method of claim 1 wherein identifying at least one ENUM service type at a signaling point separate from an ENUM database includes determining an ENUM service type at one of a PSTN switching office, an IP multimedia subsystem (IMS) node, a media gateway controller (MGC), a session initiation protocol (SIP) proxy server, an H.323 gatekeeper, a softswitch, a next generation network (NGN) node, an application server, a service control point, a mobile switching center (MSC) server, a home location register (HLR), an IMS home subscriber server (HSS), and a presence server.

3. The method of claim 1 wherein transmitting the ENUM query message includes transmitting the ENUM query message to a single ENUM server having access to ENUM data for plural ENUM service types.

4. The method of claim 1 wherein:
   identifying at least one ENUM service type includes identifying a plurality of ENUM service types;
   generating at least one query message includes generating a plurality of ENUM query messages corresponding to the identified ENUM service types; and
   transmitting the at least one query message includes transmitting each of the ENUM query messages to an ENUM server corresponding to the service type identified for each query message.

5. The method of claim 1 comprising inserting a service type identifier parameter in the at least one ENUM query message:
   intercepting the at least one ENUM query message at a routing node between the signaling point and the at least one ENUM database;
   removing the ENUM service type identifier from the at least one ENUM query message;
   forwarding the at least one ENUM query message to the at least one ENUM server for providing the ENUM service;
   receiving an ENUM response from the at least one ENUM server; and
   forwarding the response to the signaling point.

6. The method of claim 1 comprising:
   inserting a plurality of ENUM service types in the at least one ENUM query message;
   receiving the at least one ENUM query message at a routing node between the signaling point and the at least one ENUM database;
   at the routing node, formulating a plurality of service specific ENUM queries and transmitting the ENUM queries to ENUM databases corresponding to the specific service types;
   receiving responses to the ENUM queries; and
   combining ENUM data from the received responses into a single ENUM response and forwarding the response to the signaling point.

7. The method of claim 1 comprising:
   receiving the transmitted ENUM query at a routing node between the signaling point and the at least one ENUM database, and at the routing node:

accessing a subscriber preferences database to identify subscriber preferences associated with at least one ENUM service type;

formulating a new ENUM query corresponding to an ENUM service type specified by a subscriber preference; and forwarding the ENUM query to at least one ENUM database for providing the ENUM service type specified by the subscriber preferences.

8. The method of claim 1 comprising inserting a max URIs parameter in the at least one ENUM query message specifying a maximum number of URIs to be returned by an ENUM database.

9. A system for specifying an E.164 number mapping (ENUM) service type in a communications network that utilizes a plurality of different ENUM service types, the system comprising:

a signaling point for detecting a communication origination event for establishing communication with a called party destination, for identifying at least one ENUM service type from a plurality of different ENUM service types based on a media type associated with the called party destination, for generating at least one ENUM query message that includes at least one ENUM service type identifier that identifies to the at least one identified ENUM service type, and for transmitting the at least one ENUM query message; and at least one ENUM server for receiving the at least one ENUM query message and that is configured to utilize the at least one ENUM service type identifier to locate at least one destination identifier for establishing the communication with the called party destination via the at least one identified ENUM service type.

10. The system of claim 9 wherein the signaling point comprises one of a PSTN switching office, an IP multimedia subsystem (IMS) node, a media gateway controller (MGC), a session initiation protocol (SIP) proxy server, a H.323 gatekeeper, a softswitch, a next generation network (NGN) node, an application server, a service control point, a mobile switching center (MSC) server, a home location register (HLR), an IMS home subscriber server (HSS), and a presence server.

11. The method of claim 9 wherein the at least one ENUM server comprises a single ENUM server having access to ENUM data for plural ENUM service types.

12. The system of claim 9 wherein the at least one ENUM server comprises a plurality of ENUM servers corresponding to different ENUM service types and wherein the signaling point is adapted to generate a plurality of ENUM query messages corresponding to a plurality of identified ENUM service types and transmit each query message to the ENUM server corresponding to the service type identified for each query message.

13. The system of claim 9 comprising a routing node for receiving the at least one ENUM query from the signaling point, for removing an ENUM service type parameter from the at least one query, for forwarding the at least one ENUM query to at least one ENUM server corresponding to the identified ENUM service type, for receiving an ENUM response from the ENUM server, and forwarding a response to the signaling point.

14. The system of claim 9 comprising a routing node for receiving the at least one ENUM query from the signaling point, for identifying a plurality of ENUM service types based on service type parameters in the query, for formulating a plurality of ENUM queries to ENUM database corresponding to a specific service types, for receiving ENUM responses from the ENUM servers, for combining ENUM data from the responses in to a single ENUM response and for forwarding the single ENUM response to the signaling point.

15. The system of claim 9 comprising a routing node for receiving the ENUM query from the signaling point, for accessing subscriber preferences to determine a subscriber preferred ENUM service type, for formulating an ENUM query to an ENUM server corresponding to the subscriber preferred service type.

16. The system of claim 9 wherein the signaling point is adapted to insert a max URIs parameter in the ENUM query specifying a maximum number of URIs to be returned to the signaling point.

17. A signaling point for identifying an E.164 number mapping (ENUM) service type and for formulating at least one ENUM query message according to the identified ENUM service type, the signaling point comprising:

an ENUM service type identifier for detecting a communication requiring ENUM service and for identifying at least one ENUM service type for the communication based on a media type associated with a called party destination of the communication; and an ENUM query message generator for generating an ENUM query that includes at least one ENUM service type identifier that identifies the at least one identified ENUM service type and for transmitting the at least one ENUM query message to at least one ENUM server that is configured to utilize the at least one ENUM service type identifier to locate at least one destination identifier for establishing the communication with the called party destination via the at least one identified ENUM service type.

18. A computer program product comprising computer executable instructions embodied in a non-transitory computer readable medium for performing steps comprising:

detecting, at a signaling point separate from an ENUM database, a communication origination event for establishing communication with a called party destination;

identifying, at the signaling point separate from the ENUM database, at least one ENUM service type from a plurality of different ENUM service types based on a media type associated with the called party destination;

generating at least one ENUM query message that includes at least one ENUM service type identifier that identifies the at least one identified ENUM service type; and transmitting the at least one ENUM query message to at least one ENUM server that is configured to utilize the at least one ENUM service type identifier to locate at least one destination identifier for establishing the communication with the called party destination via the at least one identified ENUM service type.

* * * * *